United States Patent
Klein et al.

[15] 3,649,871
[45] Mar. 14, 1972

[54] METHOD OF AND APPARATUS FOR MEASURING ANGULAR ACCELERATION

[72] Inventors: Hans-Christof Klein, Hattersheim; Gunther Werner, Oberstedten, both of Germany

[73] Assignee: Alfred Teves GmbH, Frankfurt am Main, Germany

[22] Filed: Feb. 17, 1970

[21] Appl. No.: 12,113

Related U.S. Application Data

[62] Division of Ser. No. 762,402, Sept. 25, 1968, Pat. No. 3,522,973.

[52] U.S. Cl. ................................................317/5, 324/162
[51] Int. Cl. ..........................................................G01p 3/42
[58] Field of Search........................317/5; 340/262; 324/162

[56] References Cited

UNITED STATES PATENTS 2,645,755   7/1953   Garfield..............................324/162
2,942,184   6/1960   Sihvonen et al. .....................324/162
2,641,458   6/1953   Gilvarry et al.........................324/162
3,026,148   3/1962   Ruof.......................................303/21
3,234,447   2/1966   Sauber..................................318/327

FOREIGN PATENTS OR APPLICATIONS 1,235,051   2/1967   Germany..............................324/162

*Primary Examiner*—L. T. Hix
*Attorney*—Karl F. Ross

[57] ABSTRACT

A disk formed with peripheral notches or magnetic regions forms the input of an acceleration-measuring device. As the disk turns these notches or magnetic regions are scanned by a pickup coil, thereby producing a pulse train for which a pulse shaper ensures pulses of equal duration and amplitude, the frequency being proportional to angular velocity. The signal is then averaged. The average is integrated in two consecutive equal time periods and the difference of the two resulting integrals is obtained by an algebraically operating summing amplifier, the difference being equal to the angular acceleration.

6 Claims, 9 Drawing Figures

Hans-Christof Klein
Günther Werner
INVENTORS.

BY

Attorney

METHOD OF AND APPARATUS FOR MEASURING ANGULAR ACCELERATION

CROSS-REFERENCE TO RELATED APPLICATION

This application is a division of application Ser. No. 762,402 filed Sept. 25, 1968, now U.S. Pat. No. 3,522,973.

1. Field of the Invention

Our present invention relates to a method of and an apparatus for metering angular acceleration, in particular, the angular acceleration of a motor-vehicle wheel to operate an antiskid system for regulating the braking force of the vehicle wheel brakes to prevent locking thereof.

2. Background of the Invention

Due to the increasing size and speed of today's motor vehicles, coupled with the increased number of these vehicles in use, safety precautions of all sorts are becoming more necessary. One particular field of interest is in the nonskid regulation of braking systems to prevent the vehicle wheels from locking.

It is known that for ideal braking the wheel should continue rolling at all times so that virtually all the actual frictional work of braking is done by the vehicle brake. Locking of the wheel is extremely dangerous since this tends to decrease braking efficiency while it creates several hazards, such as putting the vehicle into frequently uncontrollable, unguidable skids, ruining the vehicle tires and removing control of the braking process from the operator.

Many solutions for controlling the braking force have been suggested, and many of them require some means for determining just what the angular acceleration or deceleration of the wheel is as a basis for regulating the braking force. Such means often is in the form of a mechanical accelerometer which has the disadvantage of adding additional moving parts to the motor vehicle—something never desired—and also have not been found to be completely accurate.

OBJECT OF THE INVENTION

Thus, it is an important object of our invention to provide a method of and apparatus for metering angular acceleration which is accurate, has a minimum of moving parts and is reasonably inexpensive to produce.

SUMMARY OF THE INVENTION

We do this by providing a brake disk or other wheel-coupled disk with a plurality of peripheral notches or magnetic regions. These are scanned as they pass by a fixed sensing device or pickup coil which produces a pulse train (in known manner) whose pulses have a frequency directly proportional to the angular velocity of the brake disk. Thus, no new moving parts are needed in the vehicle, merely a somewhat altered rotating disk brake part and a sensing device cooperating with it.

The pulse train produced by this device is fed to a pulse shaper which produces a second train of pulses of equal amplitude and duration, but with a frequency or pulse spacing proportional to the angular velocity of the disk. This pulse train is averaged in a resistance-capacitance (RC) network to produce an integratable signal.

This signal is now either differentiated to produce the first derivative of angular velocity (therefore angular acceleration) or, as is preferred, fed into an integration circuit. In this latter circuit the signal is integrated during two consecutive and, generally, equal time periods and the difference of these integrals is taken, e.g., by a summing amplifier. Mathematically it can be shown that the difference of these two integrals is proportional to the angular acceleration.

As can be seen, our invention works almost entirely electronically, a feature which is highly desirable in the contaminated, vibratory conditions it will have in a motor vehicle since electronic circuits, especially the modern semiconductor ones, can well survive under such conditions.

Furthermore, the circuitry of our invention is quite simple since the operations of integration and differentiation are easily carried out electronically.

DESCRIPTION OF THE DRAWING

These and other features and advantages of our invention will be described in the following, with reference to the drawing in which.

SPECIFIC DESCRIPTION

Figure 1:
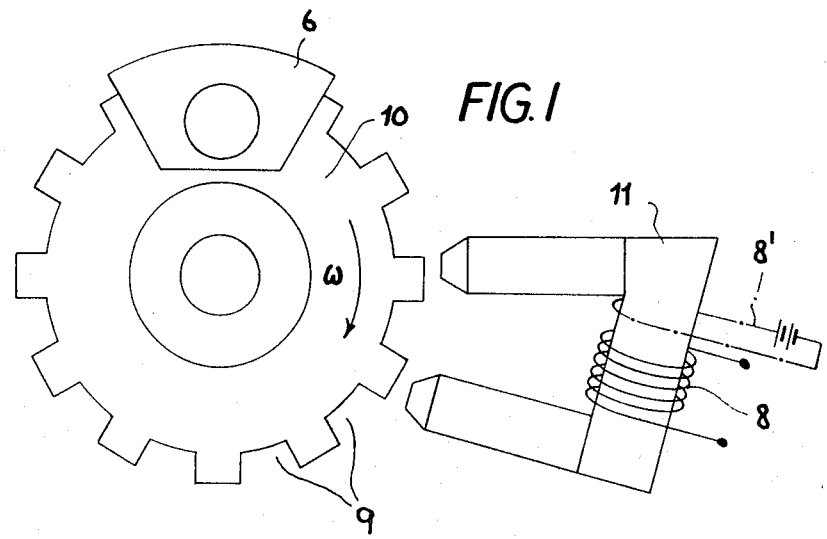
FIG. 1 is a diagrammatic view of a disk and a sensing device according to our invention.
Figure 3:
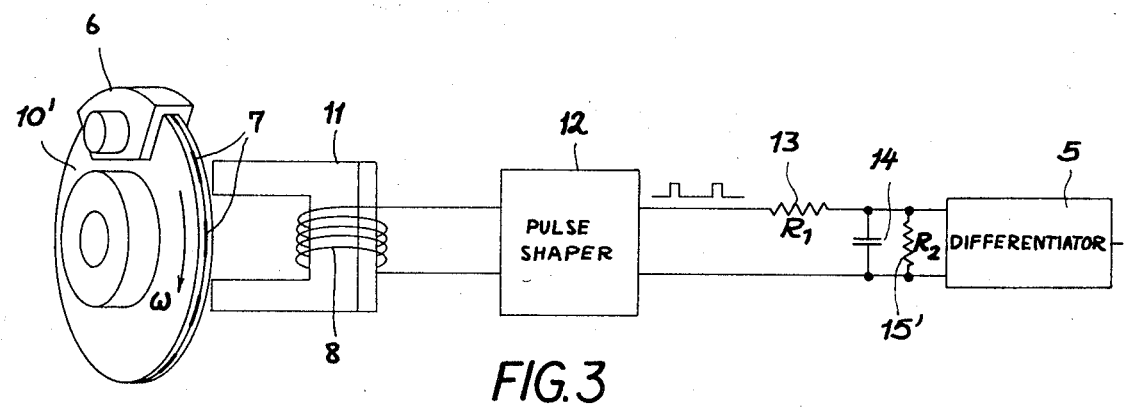
FIG. 3 is a diagram illustrating an embodiment of our invention.

FIGS. 1 and 3 show a sensing device 11 around which is wound a pickup coil 8 (and generally an energizing coil 8') mounted nonrotatably just adjacent a disk, preferably a brake disk 10 with a disk brake 6 of a motor vehicle as seen in the commonly assigned application Ser. No. 618,058 titled "DISK BRAKE" by Juan Belart, now U.S. Pat. No. 3,442,354.

This disk 10 or 10' can either be formed with peripheral notches 9 or be provided with a wire or band 4 around its periphery having magnetic portions 7. As either one of the brake-disk portions between the notches 9 or one of the magnetic portions 7 passes the sensing device 11, a brief pulse P, as seen in the graph in FIG. 2 where time $t$ is shown along the abscissa and the voltage (or current) amplitude U is shown along the ordinate, is produced in the coil 8.

Figure 2:
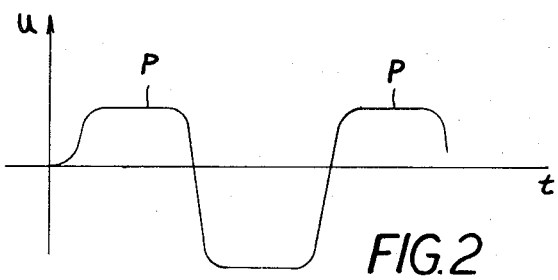
FIG. 2 is a graph showing the output of the sensing device.
Figure 4:
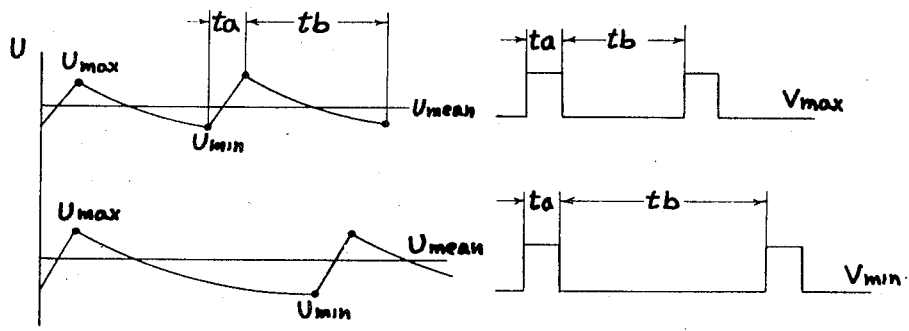
FIGS. 4, 5, 6, and 7 are graphs illustrating the principles on which our invention is based.

This signal, shown in FIG. 2, is advantageously transformed in a pulse shaper 12 to square pulses of equal amplitude and duration, or height and width as seen to the right in FIG. 4.

After the pulse shaper 12, the signal is smoothed or averaged in a RC network comprising a resistor 13 and a capacitor 14 in parallel with a resistor 15 (FIG. 8) or 15' (FIG. 3). This network averages signal, producing waves as shown to the left in FIG. 4 where the upper graphs represent the waves produced at high velocity or maximum velocity $V_{max}$ and the lower waves those produced at low or minimum velocity $V_{min}$. These waves are the voltages produced across the capacitor 14 by the pulses shown immediately to the right. For both waves or signals, $t_a$ is of equal length, but $t_b$ varies in proportion to the velocity. An average voltage U or $U_{mean}$ is also shown here, the smoothing network producing a far from completely even signal.

Figure 5:
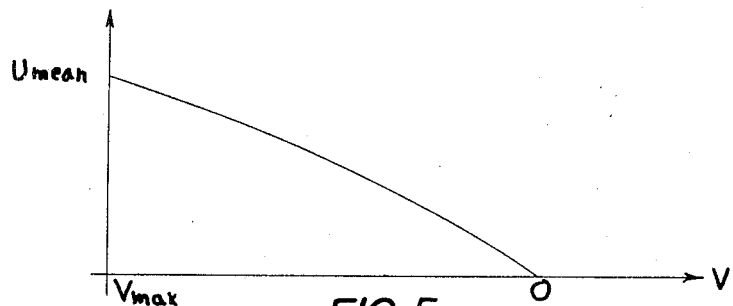

It is of importance to note that the average voltage $U_{mean}$ is proportional to the velocity. This relationship is shown in FIG. 5 where velocity V is shown along the abscissa and voltage $U_{mean}$ on the ordinate. It may be seen that there is a near-perfect linear proportion between the two.

Since it is known that velocity V after any elapsed time $t$ or $V_{(t)}$ is equal to the original velocity $V_0$ less the product of deceleration $b$ and the elapsed time $t$, the following formula can be established:

$$V_{(t)} = V_0 - bt \qquad (1)$$

Figure 6:
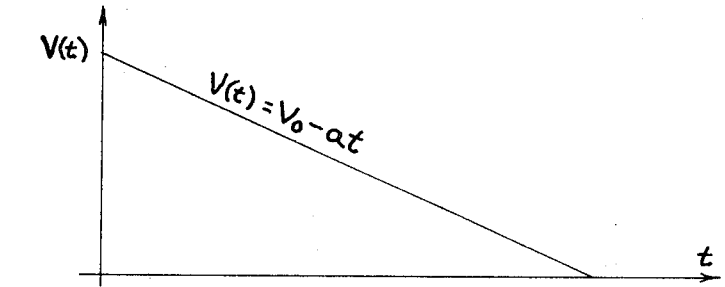

This is shown graphically in FIG. 6.

Figure 7:
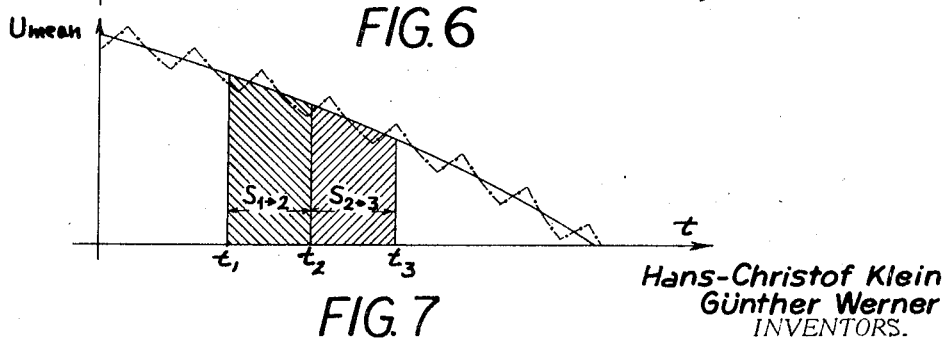

The striking similarity between FIGS. 5 and 6 leads to the relationship shown in FIG. 7 where $U_{mean}$ and time $t$ is plotted for a deceleration motor vehicle, as in FIG. 6. It is from this important relationship that out invention computes the angular acceleration.

If we start with the relationship $$ds/dt = v \qquad (2)$$

and transform it into $$ds = v \times dt, \qquad (3)$$

where $ds/dt$ is the differential of displacement $s$ with time $t$, we can set up the following integral equations in accordance with the notation of FIG. 7:

$$\int ds = \int_{t_1}^{t_2} (V_0 - bt)\, dt = \left| V_0 t - \frac{bt^2}{2} \right|_{t_1}^{t_2} \qquad (4)$$

Solving for the separate areas $S_{1-2}$ and $S_{2-3}$ gives the following:

$$S_{1-2} = V_0(t_2-t_1) - (b/2)(t_2^2-t_1^2), \text{ and} \quad (5)$$
$$S_{2-3} = V_0(t_3-t_2) - (b/2)(t_3^2-t_2^2); \quad (6)$$

it will be noted that $a = -b$, where $a$ is acceleration and $b$ is deceleration.

The difference between the equations (5) and (6) is:
$$(S_{1-2}) - (S_{2-3}) =$$
$$V_0[(t_2-t_1)-(t_3-t_2)] - (b/2)[(t_2^2-t_1^2)-(t_3^2-t_2^2)] \quad (7)$$

It is also evident that
$$(t_2-t_1) = (t_3-t_2) = \Delta t, \quad (8)$$

which can be factored to
$$t_2^2 - t_1^2 = (t_2+t_1)(t_2-t_1), \quad (9)$$
$$t_3^2 - t_2^2 = (t_3+t_2)(t_3-t_2) \quad (10)$$

Substituting equations (8), (9), and (10) into equation (7) and solving brings about the following:
$$(S_{1-2}) - (S_{2-3}) = -(b/2)\Delta t[(t_2+t_1)-(t_3+t_2)] \quad (11)$$

which is equal to:
$$= -(b/2)\Delta t[t_1-t_3] \quad (12)$$

Substituting the identity
$$t_1 - t_3 = -2\Delta t \quad (13)$$

into equation (12) gives the following:
$$(S_{1-2}) - (S_{2-3}) = -(b/2)\Delta t[-2\Delta t] \quad (14)$$

Equation (14) can be rewritten as follows:

$$\int_{t_1}^{t_2} V_{(t)} dt - \int_{t_2}^{t_3} V_{(t)} dt = b[\Delta t]^2 \quad (15)$$

which shows that the difference of the integrals of two velocities during consecutive time periods is proportional to the acceleration, since time $t$ is constant.

Furthermore, since $U_{mean}$ is proportional to velocity V, the equation below can established:

$$\int_{t_1}^{t_2} U_{mean} dt - \int_{t_2}^{t_3} U_{mean} dt \approx K \times b \approx K_2 \omega \quad (16)$$

wherein $K_1$ and $K_2$ are proportionality constants, and
$$\omega = b/r,$$
where $\omega$ is angular acceleration and $r$ is a radius included in the proportionality constant $K_2$.

Figure 8:
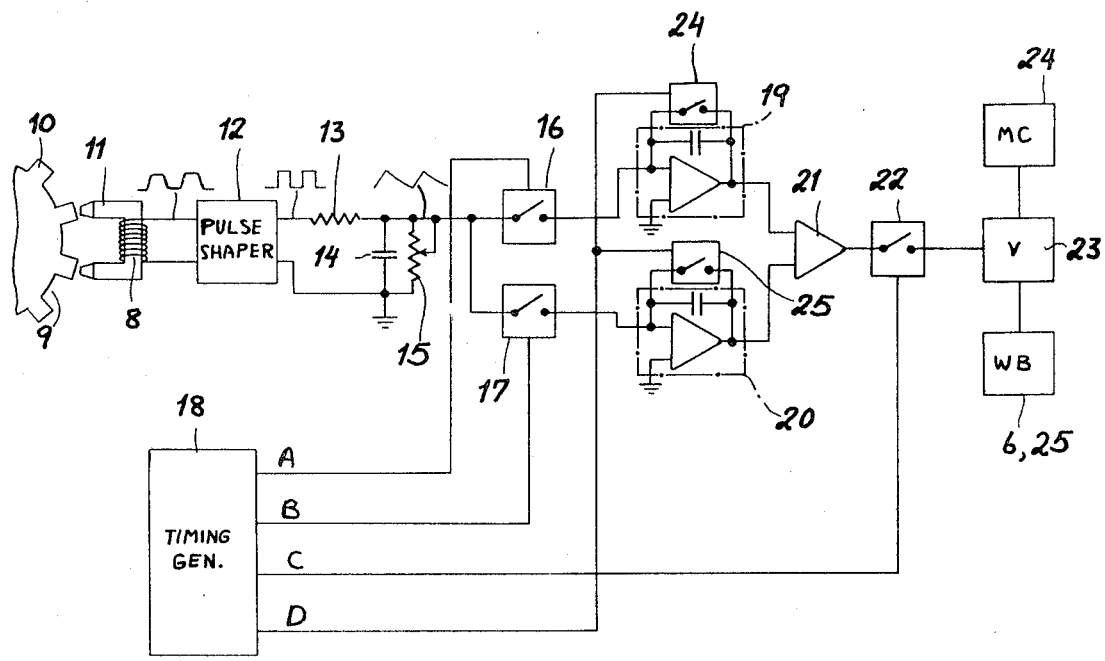
FIG. 8 is a schematic diagram of the preferred embodiment of our invention, partially as seen in FIG. 1.

An apparatus for carrying out the above-described computation is shown in FIG. 8. Here the output of the equalizing network is connected through two transistor switches 16 and 17 to two transistor integrators 19 and 20 respectively shunted by switches 24 and 25. The output of these integrators 19 and 20 is fed into a difference-taking summing amplifier 21 whose output is connected through a switch 22 to a valve arrangement 23 located between a master cylinder 25 and a wheel brake 25.

Figure 9:
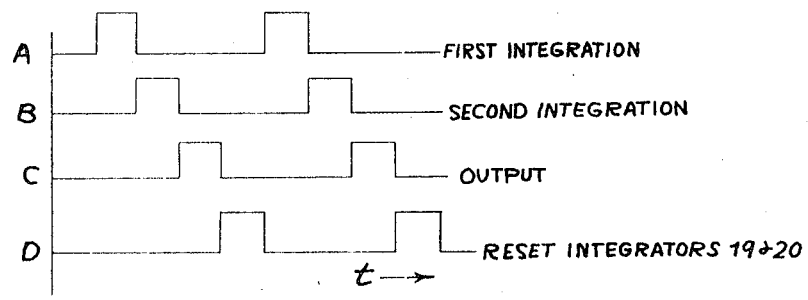
FIG. 9 is a timing chart illustrating the cycle of operation of our invention.

A timing generator 18 generates for separate pulse trains A, B, C, and D as shown in FIG. 9 to control the operation of the circuit as follows:

The output of the smoother network is fed first through the switch 16 into the integrator 19 and subsequently through the switch 17 into the integrator 20 according to consecutive pulses in trains A and B. The two integrals are compared in the subtractor 21 and their difference is fed into the valve 23 on closing of switch 22 by a pulse from train C. On completion of these three operations, a fourth pulse from train D sets the integrators at zero voltage and the next pulse A starts the cycle over again.

In this manner there is a constantly pulsating output for the valve 23 which is proportional to the angular acceleration of the disk 10 and therefore allows controlling of the braking force in the wheel brake 25. The frequency of the work cycle of the circuit should be relatively high compared to that of the incoming pulses from pulse shaper 12 so that a highly accurate result is obtained.

FIG. 3 shows an alternative embodiment of our invention. Here the simple fact that the first derivative of angular velocity is equal to angular acceleration is used. Thus, a differentiator 5 is merely coupled to the output of the smoother network across resistor 15' to produce this output. However, the main problem of such an arrangement, in spite of its simplicity, is that the output across the capacitor 14 is not perfectly smooth by any means, so that a widely varying result will be obtained from the differentiator 5. The use of two integrals which are compared to each other automatically eliminates any such discrepancies, since those irregularities present in one integral will be the same as those in the other, and the operation of subtraction will cause them to cancel each other.

The improvement described and illustrated is believed to admit of many modifications within the ability of persons skilled in the art, all such modifications being considered within the spirit and scope of the invention except as limited by the appended claims.

We claim:

1. A method of operating an acceleration-responsive device in accordance with the angular acceleration of a rotating body, comprising the steps of:
   generating a pulse train of pulses of substantially equal amplitude and duration and having a frequency proportional to the angular velocity of said body;
   integrating said pulse train during two substantially consecutive equal time periods to form two integrals; and
   differentially combining said integrals to produce an output capable of operating said device and proportional to said angular acceleration.

2. The method defined in claim 1 further comprising the step of averaging said pulse train to form a substantially continuous signal having an amplitude variable in proportion to the frequency of said pulse train.

3. A system for operating an acceleration-responsive device in accordance with the angular acceleration of a rotating body, said system comprising:
   signal-generator means associated with said body for producing a pulse train of a frequency proportional to the angular velocity of said body;
   smoothing the shaped pulse train and thereby producing a substantially continuous signal having an amplitude variable in proportion to the frequency of said pulse train;
   means for integrating the smoothed pulse train during two substantially consecutive time periods to form two integrals; and
   output means including a difference-taking summing amplifier for combining said integrals to produce a signal capable of operating said device and proportional to said angular acceleration.

4. The system defined in claim 3 wherein said averaging means is a resistance-capacitance network, and said shaping means is a pulse shaper.

5. The system defined in claim 3 wherein said signal generator means comprises a disk formed with peripheral notches, and a pickup coil proximal to the periphery of said disk and nonrotatable in relation thereto for generating an output proportional to the angular velocity thereof.

6. The system defined in claim 3 wherein said signal-generator means comprises a disk having peripheral magnetized portions and a pickup coil proximal to the periphery of said disk and nonrotatable in relation thereto for generating an output proportional to the angular velocity thereof.

\* \* \* \* \*